(12) United States Patent
Mitsufuji

(10) Patent No.: US 9,654,872 B2
(45) Date of Patent: May 16, 2017

(54) INPUT DEVICE, SIGNAL PROCESSING METHOD, PROGRAM, AND RECORDING MEDIUM

(75) Inventor: Yuhki Mitsufuji, Tokyo (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 13/552,321

(22) Filed: Jul. 18, 2012

(65) Prior Publication Data

US 2013/0028439 A1  Jan. 31, 2013

(30) Foreign Application Priority Data

Jul. 26, 2011 (JP) ................................ 2011-163153

(51) Int. Cl.
*H04R 3/00* (2006.01)
*G06F 3/16* (2006.01)
*G10L 25/48* (2013.01)

(52) U.S. Cl.
CPC ............. *H04R 3/005* (2013.01); *G06F 3/165* (2013.01); *G06F 2200/1636* (2013.01); *G10L 25/48* (2013.01); *H04R 2430/21* (2013.01)

(58) Field of Classification Search
CPC .............. G06F 3/0487; G06F 3/165; G06F 2200/1636; G10L 25/48; H04R 3/005; H04R 2430/21
USPC ..................... 381/92, 97, 327–330
See application file for complete search history.

(56) References Cited

U.S. PATENT DOCUMENTS

| 2008/0187148 A1* | 8/2008 | Itabashi ............... G10K 11/178 381/71.6 |
| 2009/0202091 A1* | 8/2009 | Pedersen et al. ............. 381/313 |
| 2009/0238369 A1* | 9/2009 | Ramakrishnan et al. ...... 381/56 |
| 2011/0249824 A1* | 10/2011 | Asada ................... G06F 1/1626 381/56 |
| 2012/0057733 A1* | 3/2012 | Morii et al. .................. 381/313 |

FOREIGN PATENT DOCUMENTS

JP    2010-213099       9/2010
WO   WO 2010/125797 A1 * 11/2010

* cited by examiner

*Primary Examiner* — Ping Lee
(74) *Attorney, Agent, or Firm* — Paratus Law Group, PLLC

(57) ABSTRACT

There is provided an input device including at least two microphones placed at different positions on a chassis to face different directions on one of space axes, a low-frequency bandwidth extracting part for extracting a low-frequency bandwidth signal from a signal input from the microphones, a phase difference calculating part for calculating a phase difference using the low-frequency bandwidth signal extracted by the low-frequency bandwidth extracting part; and a control signal generating part for generating a control signal based on the phase difference calculated by the phase difference calculating part.

10 Claims, 12 Drawing Sheets

INPUT DEVICE, SIGNAL PROCESSING METHOD, PROGRAM, AND RECORDING MEDIUM

BACKGROUND

The present disclosure relates to an input device, a signal processing method, a program, and a recording medium, and in particular, to an input device, a signal processing method, a program, and a recording medium that can easily operate a desired appliance.

A method for operating an appliance, not using a controller including a button, but using a microphone has been proposed in recent years (see Japanese Patent Application Laid-Open No. 2010-213099).

SUMMARY

However, the technique described in Japanese Patent Application Laid-Open No. 2010-213099 uses a waveform of a monaural signal as a method for distinguishing a sound input by the user from a sound unintentionally input by the surroundings. Accordingly, it is difficult to operate the appliance due to, for example, the way to tap the headphone, an individual habit of operating the appliance, the change of the surroundings, the individual difference among microphones, and the temporal change of the microphone.

In view of the foregoing, the present disclosure can easily operate an appliance.

According to an embodiment of the present disclosure, there is provided an input device including: at least two microphones placed at different positions on a chassis to face different directions on one of space axes; a low-frequency bandwidth extracting part for extracting a low-frequency bandwidth signal from a signal input from the microphones; a phase difference calculating part for calculating a phase difference using the low-frequency bandwidth signal extracted by the low-frequency bandwidth extracting part; and a control signal generating part for generating a control signal based on the phase difference calculated by the phase difference calculating part.

When there are opposite phases in a low frequency band, the control signal generating part can generate a control signal based on the phase difference calculated by the phase difference calculating part.

A low-pass filter used by the low-frequency bandwidth extracting part is determined in view of a distance between the microphones.

A low-pass filter used by the low-frequency bandwidth extracting part is determined in view of a frequency of a speech.

The input device further includes a differential signal generating part for generating a differential signal using the low-frequency bandwidth signal extracted by the low-frequency bandwidth extracting part, and the control signal generating part can generate the control signal based on the differential signal generated by the differential signal generating part.

The control signal generating part can determine, based on the differential signal generated by the differential signal generating part, from which microphone an input has been performed, and generate the control signal.

The microphones are placed to face the different directions on the axis where an impact is given to the chassis.

The chassis is attached to a body.

According to still another embodiment of the present disclosure, there is provided a signal processing method, comprising, with an input device including at least two microphones placed at different positions on a chassis to face different directions on one of space axes, extracting a low-frequency bandwidth signal from a signal input from the microphones, calculating a phase difference using the extracted low-frequency bandwidth signal, and generating a control signal based on the calculated phase difference.

According to yet another embodiment of the present disclosure, there is provided a program causing an input device including at least two microphones placed at different positions on a chassis to face different directions on one of space axes to function as: a low-frequency bandwidth extracting part for extracting a low-frequency bandwidth signal from a signal input from the microphones, a phase difference calculating part for calculating a phase difference using the low-frequency bandwidth signal extracted by the low-frequency bandwidth extracting part, and a control signal generating part for generating a control signal based on the phase difference calculated by the phase difference calculating part.

According to further another embodiment of the present disclosure, there is provided a program which is recorded on a recording medium and causes an input device including at least two microphones placed at different positions on a chassis to face different directions on one of space axes to function as a low-frequency bandwidth extracting part for extracting a low-frequency bandwidth signal from a signal input from the microphones, a phase difference calculating part for calculating a phase difference using the low-frequency bandwidth signal extracted by the low-frequency bandwidth extracting part, and a control signal generating part for generating a control signal based on the phase difference calculated by the phase difference calculating part.

According to further another embodiment of the present disclosure, a low-frequency bandwidth signal is extracted from a signal input from at least two microphones placed at different positions on a chassis to face different directions on one of space axes. Then, a phase difference is calculated using the extracted low-frequency bandwidth signal, and a control signal is generated based on the calculated phase difference.

According to further another embodiment of the present disclosure, a desired appliance can be operated, in particular, by a simple operation.

DETAILED DESCRIPTION OF THE EMBODIMENTS

Figure 1:
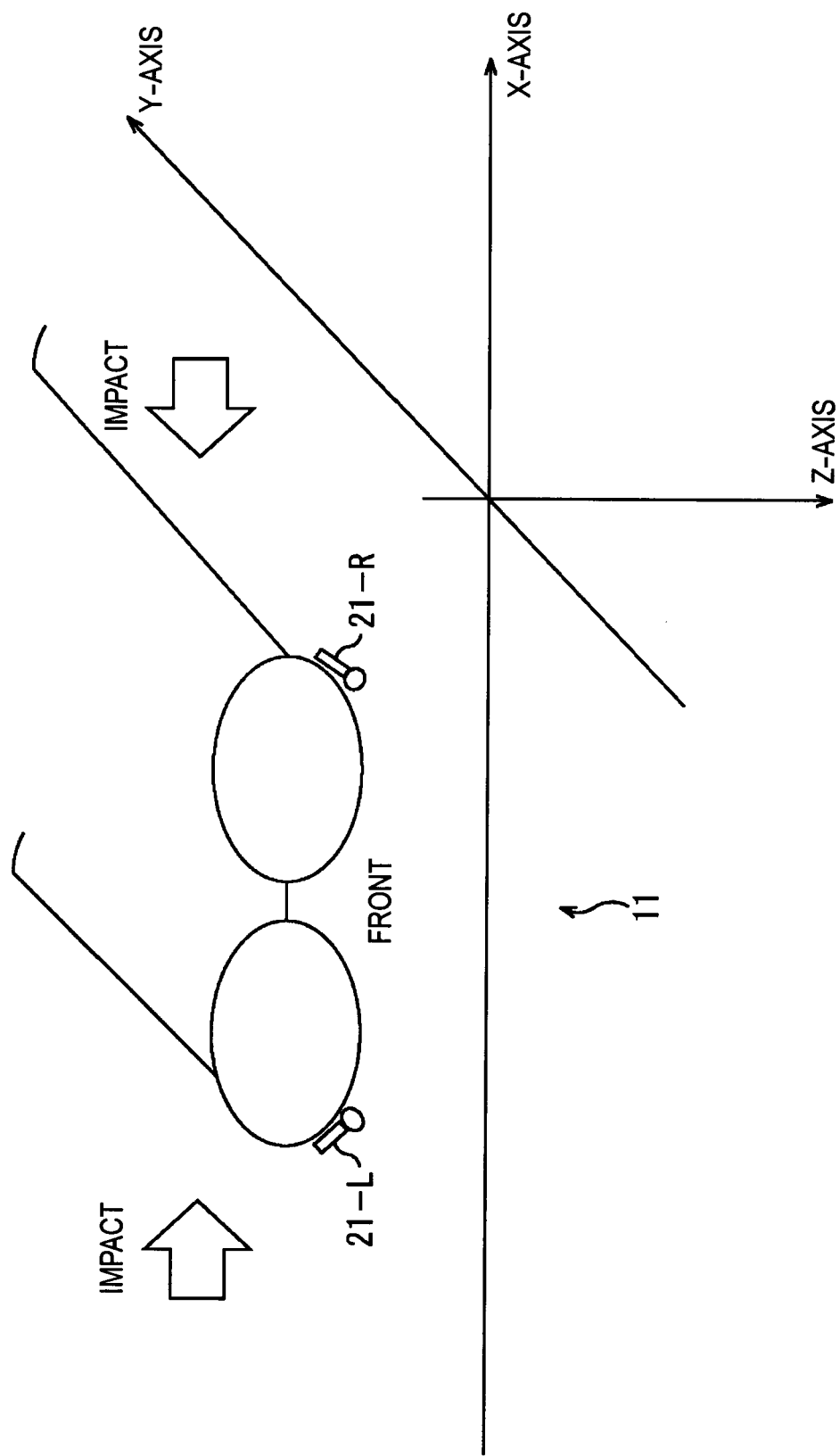
FIG. 1 is a view of an exemplary configuration of the appearance of a voice commander device according to the present technique.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present disclosure will be described.

[Exemplary Configuration of Appearance of Voice Commander Device]

FIG. 1 is a view of an exemplary configuration of the appearance of a voice commander device as an input device according to the present technique.

A voice commander device 11 includes microphones 21-L and 21-R. For example, a chassis of the voice commander device 11 is constituted of a frame of glasses worn by the user and shown in FIG. 1. In other words, for example, the voice commander device 11 is embedded in or is attached to the frame of the glasses.

Space axes are set in the example shown in FIG. 1. An X-axis shows a widthwise direction, a Y-axis shows a depth direction, and a Z-axis shows lengthwise direction relative to the front of the chassis. Note that the right side is the positive direction relative to the X-axis. The back is the positive direction relative to the Y-axis. The lower side is the positive direction relative to the Z-axis.

The microphone 21-L is placed at the left end of the chassis to face to the positive direction of the X-axis. Specifically, the microphone 21-L is placed at the lower side of the left lens frame of the glasses to face to the positive direction of the X-axis and the positive direction of the Z-axis. The microphone 21-R is placed at the right end of the chassis to face to the negative direction of the X-axis. Specifically, the microphone 21-R is placed at the lower side of the right lens frame of the glasses to face to the negative direction of the X-axis and the positive direction of the Z-axis.

In other words, the microphones 21-L and 21-R are placed at the different positions of the glasses to face to the opposite directions on the X-axis (to face to the inside of the glasses shown in FIG. 1). Note that, in the example shown in FIG. 1, although the microphones 21-L and 21-R do not have a degree in the Y-axis direction, and face to the positive direction of the Z-axis direction, the directions of the microphones 21-L and 21-R relative to the Y-axis and the Z-axis are not limited.

The user gives an impact to the chassis from the left side of the chassis of the voice commander device 11 (in the positive direction of the X-axis), or from the right side of the chassis (in the negative direction of the X-axis) so that the microphones 21-L and 21-R input a signal (a solid-borne sound) to the voice commander device 11. In other words, the impact in the X-axis direction is input to the voice commander device 11 as a signal.

The voice commander device 11 performs signal processing on the input signal, recognizes a command, and controls an appliance to be operated (not shown) using the command signal. In other words, the user can control the appliance to be operated by giving an impact to the chassis of the voice commander device 11.

The impact can be given from a side of the chassis. Although a direct impact is not necessarily given to the microphones 21-L and 21-R, it can also be given. Note that, in this case, the impact can have a strength given by a soft touch or a soft tap, namely, a minimum strength capable of giving a vibration to the chassis. The strength causing damage to the chassis is not assumed.

Hereinafter, the sound (signal) input to the microphones 21-L and 21-R is referred to as a solid-borne sound, and is distinguished from a sound input through an air vibration (airborne sound).

Note that, although the microphones 21-L and 21-R is provided at the right and left sides of the chassis one by one in the example shown in FIG. 1, the number of the microphones provided at each of right and left sides can be at least one by one and is not limited to one by one. The same number of the microphones can be provided at the right and left sides and the different number of the microphones can also be provided. Furthermore, the positions of the microphones 21-L and 21-R are not limited to the positions shown in FIG. 1. In other words, at least two microphones can be placed at the different positions.

Furthermore, although the direction of the impact from the outside and the positions of the microphones 21-L and 21-R that are on the X-axis have been described in the example shown in FIG. 1, the direction and the positions are not limited to those on the X-axis, and can be on the Y-axis or the Z-axis. In other words, at least two microphones can be placed to face to the different directions (opposite directions) on one of the space axes. Then, the microphones are placed to give an impact (operation by the user) in the axis direction.

Note that the direction of the microphone is assumed as the same direction of the internal component in the above description. For example, even though the microphones are headed in the same direction, their components can be headed in the opposite directions.

Hereinafter, when it is not necessary to distinguish the microphone 21-L from the microphone 21-R, both of them will be collectively referred to as microphones 21.

[Exemplary Configuration of Inside of Voice Command Device]

Figure 2:
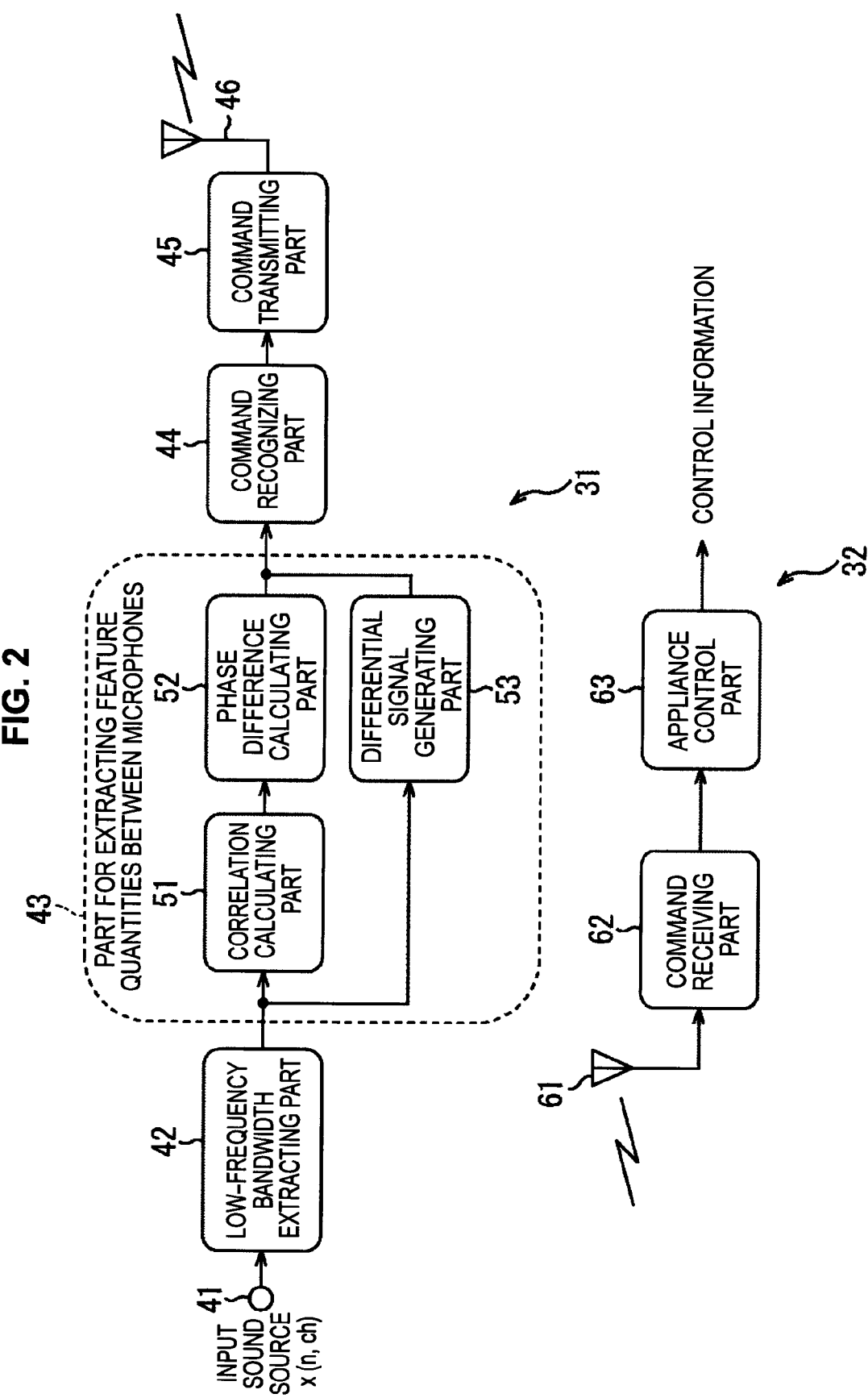
FIG. 2 is a block diagram of an exemplary configuration of the inside of the voice commander device.

FIG. 2 is a block diagram of an exemplary configuration of the inside of the voice commander device.

The voice commander device 11 roughly includes a command generation block 31 and an appliance control block 32 in the example shown in FIG. 2.

The command generation block 31 is provided, for example, in the chassis attached to the user's body. The command generation block 31 processes the signals input from the microphones 21 to generate a command signal for operating the appliance to be operated, and transmits the generated command signal to the appliance control block 32.

The appliance control block 32 is provided, for example, near the appliance to be operated or at the inside of the appliance to be operated. The appliance control block 32 receives a command signal from the command generation block 31 and supplies control information to the appliance to be operated.

The command generation block 31 includes an input terminal 41, a low-frequency bandwidth extracting part 42, a part 43 for extracting feature quantities between the microphones, a command recognizing part 44, a command transmitting part 45, and an antenna 46.

The input terminal 41 supplies a signal x(n, ch) input from microphone 21 as an input sound source to the low-frequency bandwidth extracting part 42.

The low-frequency bandwidth extracting part 42 extracts, with a low-pass filter, a low-frequency bandwidth, namely, a low-pass signal from the signal input from the input terminal 41, and supplies the extracted low-pass signal to the part 43 for extracting feature quantities between the microphones.

The part 43 for extracting feature quantities between the microphones extracts feature quantities from the low-pass signal supplied from the low-frequency bandwidth extracting part 42, and supplies the extracted feature quantities to the command recognizing part 44. Specifically, part 43 for extracting feature quantities between the microphones includes a correlation calculating part 51, a phase difference calculating part 52, and a differential signal generating part 53.

The correlation calculating part 51 divides the low-pass signal from the low-frequency bandwidth extracting part 42 as time frames, and calculates the cross-correlation values of the signal divided as frames between the two microphones 21. The correlation calculating part 51 supplies the calculated cross-correlation values to the phase difference calculating part 52.

The phase difference calculating part 52 calculates the phase difference according to the cross-correlation values from the correlation calculating part 51. In other words, the phase difference calculating part 52 obtains, as the phase different information, an index having the maximum value among the absolute values of the cross-correlation values. The phase difference calculating part 52 supplies the obtained phase difference and the maximum value as the feature quantities between the low-pass signals to the command recognizing part 44.

The differential signal generating part 53 generates a differential signal using the low-pass signal from the low-frequency bandwidth extracting part 42. The differential signal generating part 53 supplies the obtained differential signal as the feature quantities between the low-pass signals to the command recognizing part 44.

The command recognizing part 44 inputs the phase difference and the maximum value from the phase difference calculating part 52 and the differential signal from the differential signal generating part 53 as the feature quantities between the low-pass signals, and performs two types of threshold determinations in order to obtain the command recognition result. The command recognizing part 44 supplies commander information denoting the obtained command recognition result to the command transmitting part 45.

The command transmitting part 45 transmits the commander information recognized by the command recognizing part 44 as a command signal to the appliance control block 32 through the antenna 46 using, for example, wireless communication.

The appliance control block 32 includes an antenna 61, a command receiving part 62, and an appliance control part 63.

The command receiving part 62 receives the command signal transmitted from the command transmitting part 45 though the antenna 61, and supplies the received command signal to the appliance control part 63.

The appliance control part 63 generates control information for controlling the appliance to be operated according to the command signal from the command receiving part 62, and transmits the generated control information to the appliance to be operated.

Note that, although the voice commander device 11 is divided into two blocks that are the command generation block 31 and the appliance control block 32 in the example shown in FIG. 2, the voice commander device 11 can also be constituted of one block. In that case, the command transmitting part 45, the antenna 46, the antenna 61, and the command receiving part 62 can be omitted.

[Process in Low-frequency Bandwidth Extracting Part]

Next, each part of the voice commander device 11 will be described in detail. First, the process in the low-frequency bandwidth extracting part 42 will be described.

The low-frequency bandwidth extracting part 42 extracts a low-frequency bandwidth from the input signal with a low-pass filter. The low-frequency bandwidth extracting part 42 obtains a low-pass signal l(n, ch) shown in the following expression (1) by applying the low-pass filter to an input signal x(n, ch).

$$l(n, ch) = \sum_{m=1}^{M_A} a(m) * l(n-m, ch) + \sum_{m=0}^{M_B} b(m) * x(n-m, ch) \quad (1)$$

In that case, the n denotes the time index of the signal. The ch denotes a microphone identifier and two is assigned to the ch in the example shown in FIG. 1. The a denotes the filter coefficient of the denominator. The b denotes the filter coefficient of the numerator. The $M_A$ denotes the filter order of the denominator. The $M_B$ denotes the filter order of the numerator.

The filter coefficients a and b are determined in view of the following two elements. One is the distance between the microphones 21. The voice commander device 11 uses the feature that a solid-borne sound has phases opposite to each other. In other words, the low-frequency bandwidth extracting part 42 extracts a solid-borne sound. Accordingly, the distance between the microphones 21 that generates the phase difference is an important element for determining the performance of the voice commander device.

Figure 3:
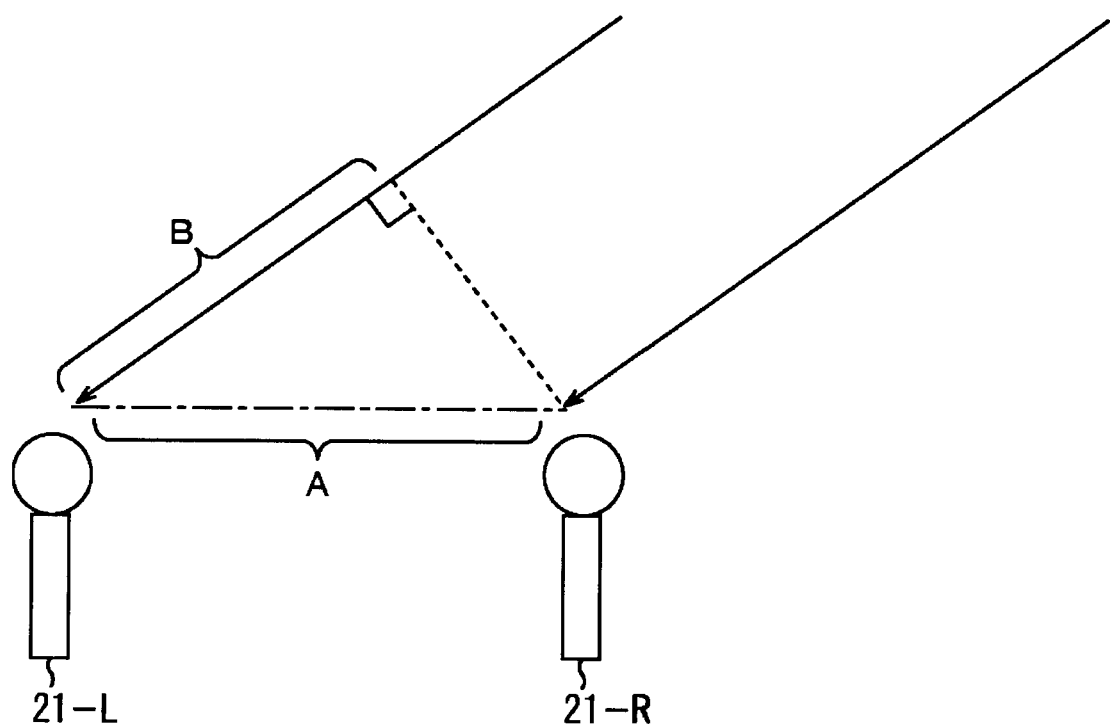
FIG. 3 is a view describing the distance between the two microphones, and the difference between the distance of an airborne sound traveling to one microphone and the distance of the airborne sound traveling to the other microphone.

FIG. 3 is a view describing the distance between the microphones 21, and the difference between the distance of an airborne sound traveling to the microphones 21-L and the distance of the airborne sound traveling to the microphones 21-R.

A distance A and a difference B typically satisfy the distance A the difference B distance according to the Pythagorean theorem. The distance A denotes the distance between the microphones 21. The difference B denotes the difference between the distance of an airborne sound traveling to the microphones 21-L and the distance of the airborne sound traveling to the microphones 21-R. When the airborne sound has phases opposite to each other in the difference B part, the opposite phases become a noise while the correlation values of the solid-bone sound are calculated. This decreases in performance of the command recognition by the command recognizing part 44.

Considering the foregoing, the low-frequency bandwidth extracting part 42 decreases the short wavelength component in the difference B part using a high-frequency removal filter (low-pass filter) in order not to include the half-wavelength of the airborne sound.

The distance A between the microphones 21 is up to 30 cm even though the microphones 21 are attached at the ends of the chassis (glasses in the example in FIG. 1) furthest from each other, and the width of the chassis is estimated as oversized. Accordingly, the difference B is necessarily within 30 cm. Assuming the speed of sound as 340 m/s, it takes 0.88 ms to travel 30 cm. The frequency equal to or higher than 567 Hz includes the half-wavelength at 0.88 ms. Blocking the frequency equal to or higher than 567 Hz can reduce accidentally extracting, as the feature, the opposite phases generated from the external sound.

The other element for determining the filter coefficients a and b is a speech. Because the microphones 21-L and 21-R are provided at the glasses in the example shown in FIG. 1, the distances from the microphones 21 to the user's mouth is very short. Accordingly, a signal having large amplitude is likely to be a solid-borne sound or a speech by the user wearing the voice commander device 11.

A speech generally has large amplitude because its basic frequency is included between 50 to 1000 Hz and its formant is included between 1 to 4 kHz. On the other hand, a solid-borne sound has its peak near 0 to 50 Hz and its amplitude decreases as the frequency becomes high.

Accordingly, extracting the signal equal to or lower than 50 Hz can eliminate the effect of the speech.

Figure 4A:
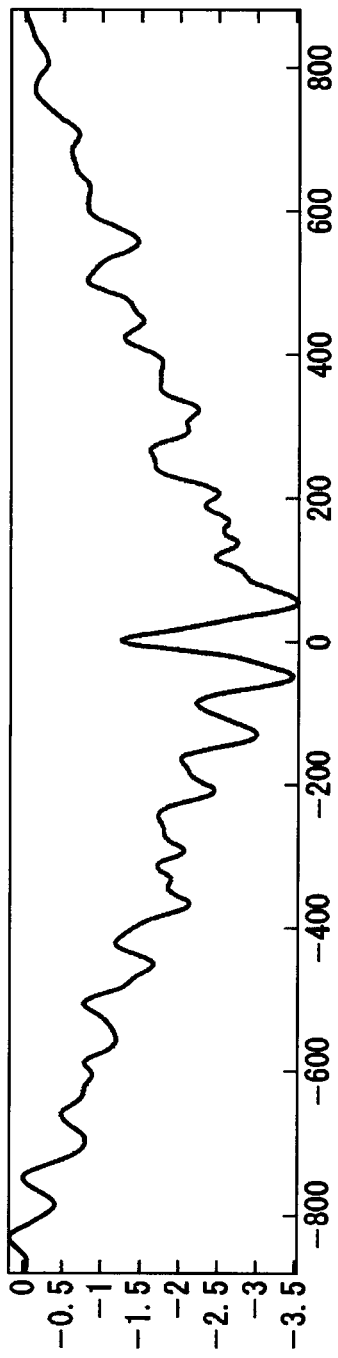
FIG. 4A is a view of an example of the cross-correlation value between the microphones.
Figure 4B:
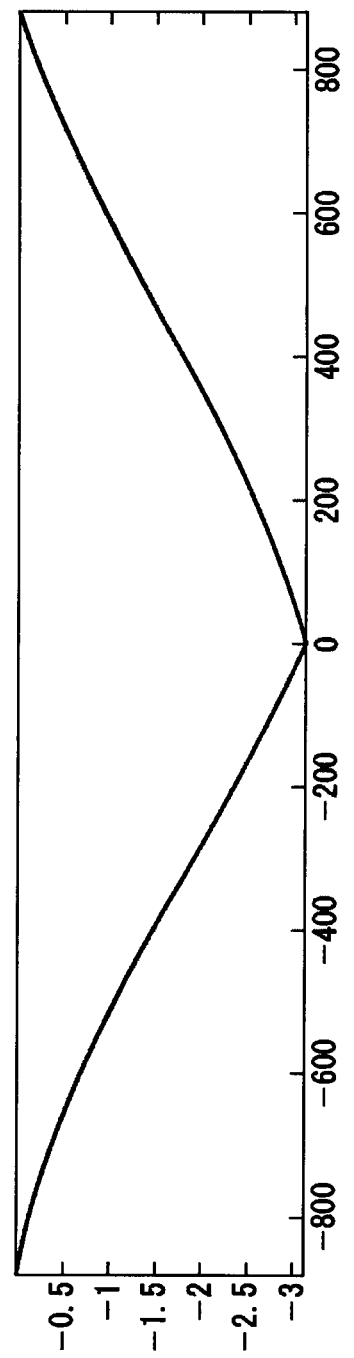
FIG. 4B is a view of an example of the cross-correlation value between the microphones.

FIGS. 4A and 4B are views of the cross-correlation value between the microphones 21. FIG. 4A is a graph of the cross-correlation value between the microphones 21 when a low-pass filter is not used. FIG. 4B is a graph of the cross-correlation value between the microphones 21 when a low-pass filter is used in the low-frequency bandwidth extracting part 42.

The vertical axis represents the cross-correlation value. The horizontal axis represents values (lugs) of the inner products obtained by sliding the number of samples one by one.

Both of the graphs show that there are identical phases when the cross-correlation value of the Y-axis is a positive value at zero position of the X-axis, and show that there are opposite phases when the cross-correlation value of the Y-axis is a negative value. The command recognizing part 44 recognizes a command by extracting the opposite phases.

However, it is difficult to read that there are opposite phases because of the speech signal in FIG. 4A. On the other hand, because the effect of the speech is eliminated with the low-pass filter, it is easy to read that a solid-borne sound has the opposite phases in FIG. 4B.

As described above, a low-pass filter in light of the above-mentioned two elements is used in the low-frequency bandwidth extracting part 42. This can simultaneously eliminate the effect of inputting an external sound equal to or higher than 567 Hz having the opposite phases between the microphones 21 and the effect of inputting the signals of a speech equal to or higher than 50 Hz having the identical phases between the microphones 21.

Note that it is preferable to consider the effect of a speech in the example shown in FIG. 1 because the chassis is glasses. However, it is preferable to simply consider at least one of the elements (distance between microphones) when the speech does not affect the chassis.

Figure 5:
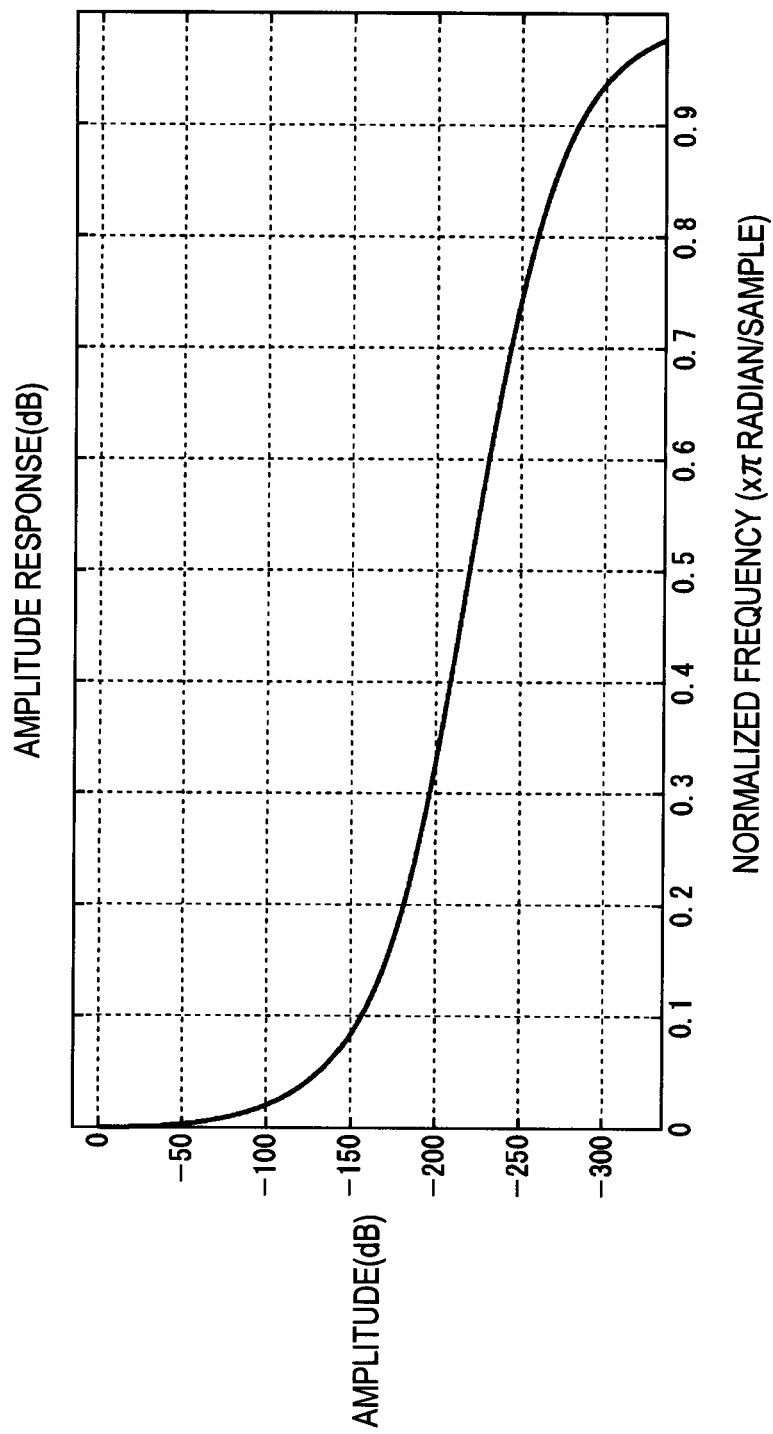
FIG. 5 is a view of an example of a low-pass filter.

For example, a low-pass filter configured to block the signal equal to or higher than 50 Hz as shown in FIG. 5 is used in the low-frequency bandwidth extracting part 42 to extract the low-pass signal l(n, ch). The low-frequency bandwidth extracting part 42 supplies the extracted low-pass signal l(n, ch) to the correlation calculating part 51 and the differential signal generating part 53.

[Process in Correlation Calculating Part]

Next, the process in the correlation calculating part 51 will be described.

The correlation calculating part 51 divides the low-pass signal (n, ch) supplied from the low-frequency bandwidth extracting part 42 as time frames to calculate the correlation values of the signal divided as frames between the microphones 21. For example, the correlation calculating part 51 finds a cross-correlation value R(fr, i) shown in the following expression (2) using the cross-correlation.

$$R(fr, i) = \begin{cases} \sum_{s=0}^{Fsize-|i|-1} I_{fr}(s, ch) \cdot I_{fr}(s+i, ch+1) & i \geq 0 \\ \sum_{s=0}^{Fsize-|i|-1} I_{fr}(s-i, ch) \cdot I_{fr}(s, ch+1) & i < 0 \end{cases} \quad (2)$$

In the expression, the R denotes the cross-correlation value. The s denotes a time index at each of the frames. The fr=0, . . . , FR−1. The FR denotes the total number of the frames. The i=−(Fsize−1), . . . , Fsize−1. Fsize denotes the total number of the samples included in one frame.

Note that although the Fsize denotes the number of the samples during about 20 ms, and the number of the frames that have been passed corresponds to the number of the samples during about 10 ms regardless of the sampling frequency in the present embodiment, values other than the values can be used.

Figure 6:
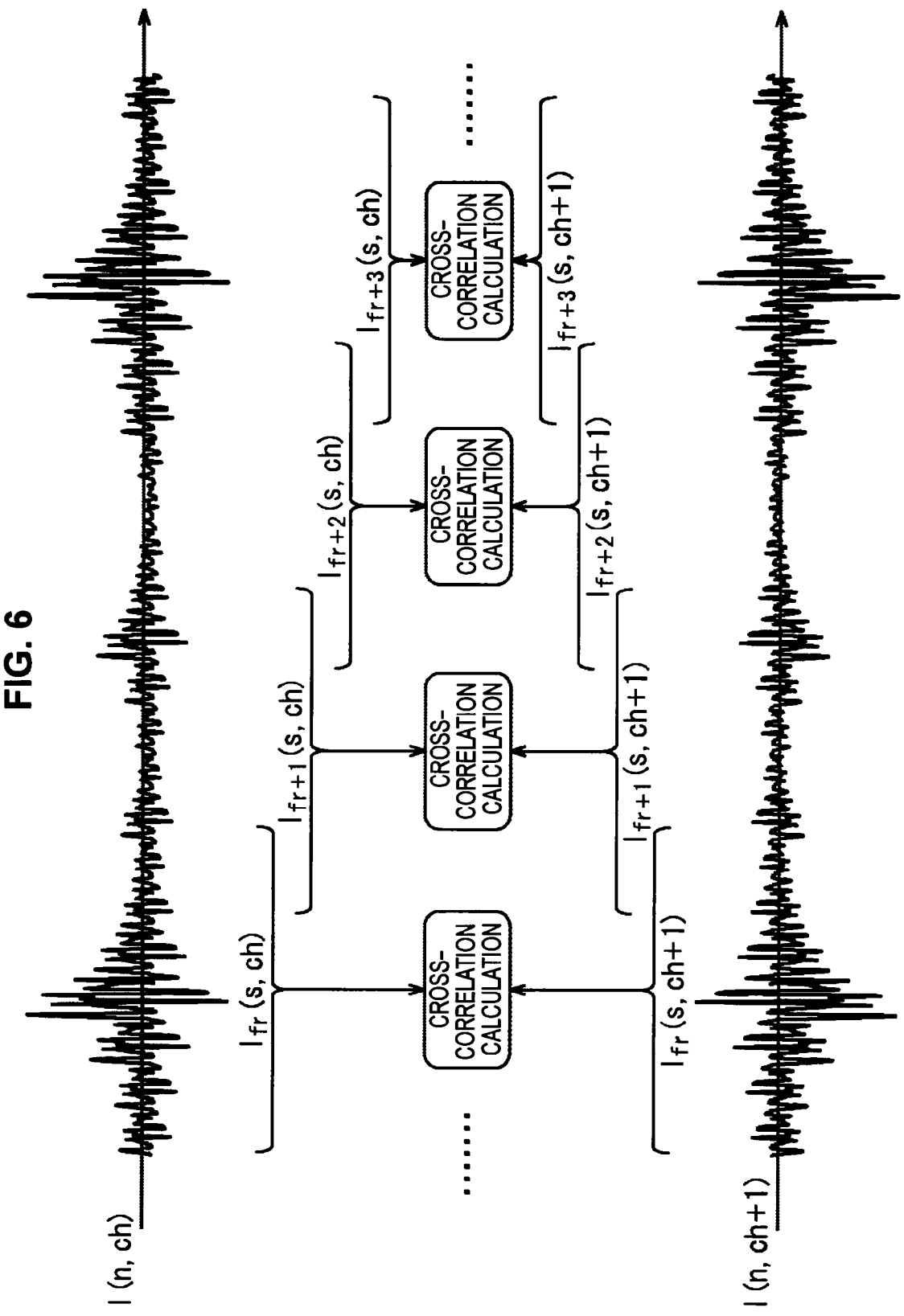
FIG. 6 is a conceptual view of cross-correlation calculations.

FIG. 6 is a conceptual view of cross-correlation calculations in the correlation calculating part 51. Note that the low-pass signals l(n, ch) and l(n, ch+1) shown in FIG. 6 conceptually shows the signals. Accordingly, although the high frequency is apparently included in the signals, the high frequency is not actually included in the signals because the low-pass signals l(n, ch) and l(n, ch+1) is filtered with a low-pass filter.

A frame fr is divided from the low-pass signal l(n, ch) of a channel ch, and a frame fr is divided from the low-pass signal l(n, ch+1) of a channel ch+1 in order to perform a cross-correlation calculation. Next, a frame fr+1 is divided from the low-pass signal l(n, ch) of the channel ch, and a frame fr+1 is divided from the low-pass signal l(n, ch+1) of the channel ch+1 in order to perform a cross-correlation calculation.

A frame fr+2 is divided from the low-pass signal l(n, ch) of the channel ch, and a frame fr+2 is divided from the low-pass signal l(n, ch+1) of the channel ch+1 in order to perform a cross-correlation calculation. Next, a frame fr+3 is divided from the low-pass signal l(n, ch) of the channel ch, and a frame fr+3 is divided from the low-pass signal l(n, ch+1) of the channel ch+1 in order to perform a cross-correlation calculation.

The cross-correlation values R(fr, i) calculated as described above are supplied to the phase difference calculating part 52.

[Process in Phase Difference Calculating Part]

Next, the process in the phase difference calculating part 52 will be described.

The phase difference calculating part 52 calculates a phase difference according to the cross-correlation values R(fr, i) supplied from the correlation calculating part 51. Specifically, the phase difference calculating part 52 calculates the absolute values of the cross-correlation values R(fr, i) as shown in the following expression (3) and obtains an index $i_{max}(fr)$ having a maximum value among the calculated absolute values as phase difference information.

$$i_{max}(fr) = \underset{i}{\mathrm{argmax}} |R(fr, i)| \quad (3)$$

Note that, although the phase difference $i_{max}(fr)$ is found as a scalar value in the expression (3), the phase difference $i_{max}(fr, f)$ can be obtained, using FFT or the like, as a vector value from the signal divided by each frequency. The f denotes a frequency index.

The phase difference calculating part 52 supplies the obtained phase difference $i_{max}(fr)$ and its maximum value $R(fr, i_{max}(fr))$ to the command recognizing part 44.

[Process in Differential Signal Generating Part]

Next, the process in the differential signal generating part 53 will be described.

The differential signal generating part 53 generates a differential signal $l_{sub}(n)$ using the low-pass signal $l(n, ch)$ from the low-frequency bandwidth extracting part 42 as shown in the following expression (4).

$$i_{sub}(n) = l(n, ch) - l(n+d, ch+1) \quad (4)$$

For example, d=0 is satisfied when the distance between the microphones is 30 cm and the chassis is glasses. In other words, the d denotes the difference between the transfer speed to the right microphone and the transfer speed to the left microphone. The d is a value that depends on the distance between the microphones and on the material of the chassis, and that can be predetermined according to statistics in a prior experiment. Although d=0 is satisfied when the distance is 30 cm and the material is glasses, |d|>0 is satisfied when the distance is, for example, 100 m because it takes more time for a sound to travel.

The differential signal generating part 53 supplies the generated differential signal $l_{sub}(n)$ to the command recognizing part 44.

[Process in Command Recognizing Part]

Next, the process of the command recognizing part 44 will be described.

The command recognizing part 44 includes a recognizer. The command recognizing part 44 inputs, to the recognizer, the phase difference $i_{max}(fr)$ and its maximum value $R(fr, i_{max}(fr))$ from the phase difference calculating part 52 and the differential signal $l_{sub}(n)$ from the differential signal generating part 53 as the feature quantities in order to obtain a command recognition result.

Specifically, the command recognizing part 44 performs a threshold determination to obtain commander information D. The commander information D includes three types: 0: no command; 1: a command input from the microphone 21-L side; and 2: a command input from the microphone 21-R side.

The threshold determination includes two stages. The command recognizing part 44 first outputs information for determining whether the command is positive or negative D1(fr) (=0 or 1), and second outputs information for determining whether the microphone 21 is right or left D2(fr) (=1 or 2). Then, the command recognizing part 44 obtains the commander information D(fr) according to the information for determining whether the command is positive or negative D1(fr) and the information for determining whether the microphone 21 is right or left D2(fr).

The first stage of the threshold determination is shown with the following expressions (5) and (6).

$$D1\_f(fr) = \quad (5)$$
$$\begin{cases} 0 & (((i_{max}(fr) < u) \cup (v < i_{max}(fr))) \cup (R(fr, i_{max}(fr)) > -thre1)) \\ 1 & ((u \leq i_{max}(fr) \leq v) \cap (R(fr, i_{max}(fr)) \leq -thre1)) \end{cases}$$

$$D1(fr) = \left(\frac{1}{2P}\sum_{i=-P}^{P-1} D1\_f(fr+i)\right) \geq thre2 \quad (6)$$

Note that the thre1 is a value equal to or more than zero. In the present embodiment, when a cross-correlation at 20 ms is calculated assuming the signal vibration as a half-open interval (−1, 1), the thre1=1.0 is set. The P denotes the number of the previous and next frames. The previous frames correspond to 50 ms, and the next frames correspond to 50 ms.

In the present embodiment, it takes 10 ms to pass a frame so that P=5 is set. Furthermore, u=v=0 is set in the present embodiment. In other words, a phase difference other than zero is not accepted. However, a phase difference other than zero can be accepted depending on the material of the chassis or the way to input.

As described above, it is determined in the first threshold determination whether the value of the phase difference is zero and is a value equal to or less than −thre1. In other words, when there are phases strongly opposite to each other in the low frequency band, it is determined that there is a command. This is a process based on the assumption that a solid-borne sound has the phases completely opposite to each other and a lag by even one sample is not accepted.

In theory, when it does not take time equal to or more one/the sampling frequency for the solid-borne sound input into the microphone 21-L to travel to the microphone 21-R, there is not a lag and there are the phases completely opposite to each other. Actually, the microphone was tapped in various ways to input a solid-borne sound, and there was not a lag between the samples in statistics. The phase difference was zero and its minimum value.

In other words, FIG. 4 is an example showing that there is not a lag. When there is a time lag between the signals of the microphones 21, the position to be observed in the X-axis has been slid from the zero position by some samples (for example, by minus one sample or one sample).

Next, the command recognizing part 44 reflects the results in the previous and next frames of the information for determining whether the command is positive or negative D1_f(fr) obtained at each frame, and recognizes the information reflected by the results as the final information for determining whether the command is positive or negative D1(fr). A solid-borne sound includes significant vibration components from the start to 100 ms. Accordingly, the command recognizing part 44 recognizes the information for determining whether the command is positive or negative D1(fr) as a command only when there is a given amount of the information D1_f(fr) divided as frames in the period of time until 100 ms (for example, the period corresponding to 2*P=10 frames). The command recognizing part 44 eliminates the information D1(fr) as a noise when the when there is not a given amount of the information D1(fr) in the period of time until 100 ms. Note that, for example, the thre2 is set as 0.5.

The second stage of the threshold determination for determining the information for determining whether the microphone 21 is right or left D2(fr) is shown with the following expressions (7) and (8).

$$V\_f(fr) = \max I_{sub}(fr * f_{size} + s) \ (0 \leq s < f_{size}) \quad (7)$$

$$V\_f(fr) = \begin{cases} V\_f(fr), & D1(fr) = 1 \\ 0, & D1(fr) = 0 \end{cases}$$

$$V(fr) = \max V\_f(fr + p) \ (-P \leq p \leq P)$$

$$D2(fr) = \begin{cases} 1 & (V \geq 0) \\ 2 & (V < 0) \end{cases} \quad (8)$$

As the second threshold determination, the command recognizing part 44 calculates the information for determining whether the microphone 21 is right or left D2(fr) using the obtained information for determining whether the command is positive or negative D1(fr) and the differential signal $1_{sub}(n)$ from the differential signal generating part 53.

The command recognizing part 44 determines that an input has been performed from the microphone 21-L when the peak of the differential signal is positive in the previous and next P frames where it is determined that the information for determining whether the command is positive or negative D1(fr) is positive. The command recognizing part 44 determines that an input has been performed from the microphone 21-R when the peak of the differential signal is negative in the previous and next P frames.

The command recognizing part 44 calculates the commander information D(fr) as shown in the following expression (9) using the information for determining whether the command is positive or negative D1(fr) and the information for determining whether the microphone 21 is right or left D2(fr) obtained as describe above. The commander information D(fr) is supplied to the command transmitting part 45.

$$D(fr) = D1(fr) * D2(fr) \quad (9)$$

[Process in Voice Command Device]

Next, an appliance control process in the voice commander device 11 will be described with reference to the flowchart shown in FIG. 7.

The user wears glasses that are the voice commander device 11 shown in FIG. 1, and softly tap the glasses from the left side of the glasses in a positive direction of the X-axis, for example, in order to lower the volume of a television device.

The microphone 21-L and the microphone 21-R input the signals in response to the impact given in the positive direction of the X-axis, respectively in step S11. Each of the signals input from the microphones 21-L and 21-R is input to the low-frequency bandwidth extracting part 42 through the input terminal 41.

The low-frequency bandwidth extracting part 42, the part 43 for extracting feature quantities between the microphones, and the command recognizing part 44 perform signal processing on the signal input from the input terminal 41 in step S12. The signal processing will be described below in detail with reference to FIG. 8.

The commander information is obtained by the signal processing on the input signal in step S12 to recognize a command, and is supplied to the command transmitting part 45.

The command transmitting part 45 and the command receiving part 62 transmit/receive the command signal in step S13.

In other words, the command transmitting part 45 transmits, as a command signal, the commander information recognized by the command recognizing part 44 to the command receiving part 62 through the antenna 46, for example, using wireless communication. The command receiving part 62 receives, through the antenna 61, the command signal transmitted from the command transmitting part 45, and then supplies the received command signal to the appliance control part 63.

The appliance control part 63 generates control information for controlling the appliance to be operated according to the command signal from the command receiving part 62, and then transmits the generated information to the appliance to be operated in step S14.

For example, the appliance control part 63 includes a database of the control information according to the command signal. The appliance control part 63 refers to the database to generate the control information for controlling the appliance to be operated (for example, control information for lowering the volume) according to the command signal from the command receiving part 62, and transmits the control information to a television device that is the appliance to be operated.

The television device lowers the volume in response to the control information.

As described above, the user can operates a desired appliance by simply tapping the side of the glasses that are the chassis a predetermined times.

In other words, the technique in the past described in Japanese Patent Application Laid-Open No. 2010-213099 uses a waveform of a monaural signal as a method for distinguishing a sound input by the user from a sound unintentionally input by the surroundings. Accordingly, it is difficult to operate the appliance due to, for example, the way to tap the headphone, an individual habit of operating the appliance, the change of the surroundings, the individual difference among microphones, and the temporal change of the microphone.

On the other hand, the voice commander device 11 uses the phase difference between the microphones and does not depend on the waveform. Accordingly, the tapped position, the way to tap, the temporal change, or the presence or absence of the glove does not affect the operation. Simply tapping the side of the glasses that are the chassis can operate a desired appliance.

Specifically, the user does not have to tap a specific part of the chassis, and the user can operate a desired appliance by simply tapping the chassis in a direction opposite to the microphones 21 attached at the chassis on an axis (for example, the X-axis in FIG. 1).

To implement the technique in the past described in Japanese Patent Application Laid-Open No. 2010-213099, the user preferably taps near the microphone. Thus, the microphone is preferably placed at the optimal position for an ease tap. Accordingly, it is difficult to place the microphone at the optimal position for a sound.

On the other hand, the user does not have to directly tap the microphone in the voice commander device 11 so that the microphone can be relatively freely placed. Furthermore, because the microphone is not directly tapped, the microphone is not deteriorated. The temporal change or the change of the frequency characteristic does not affect the accuracy.

Furthermore, in an appliance including many stereo microphones, the microphones are oppositely placed to each other in order to present the texture of stereo. This can be used.

[Signal Processing in Voice Commander Device]

Next, the signal processing in step S12 shown in FIG. 7 will be described with reference to the flowchart shown in FIG. 8.

Figure 7:
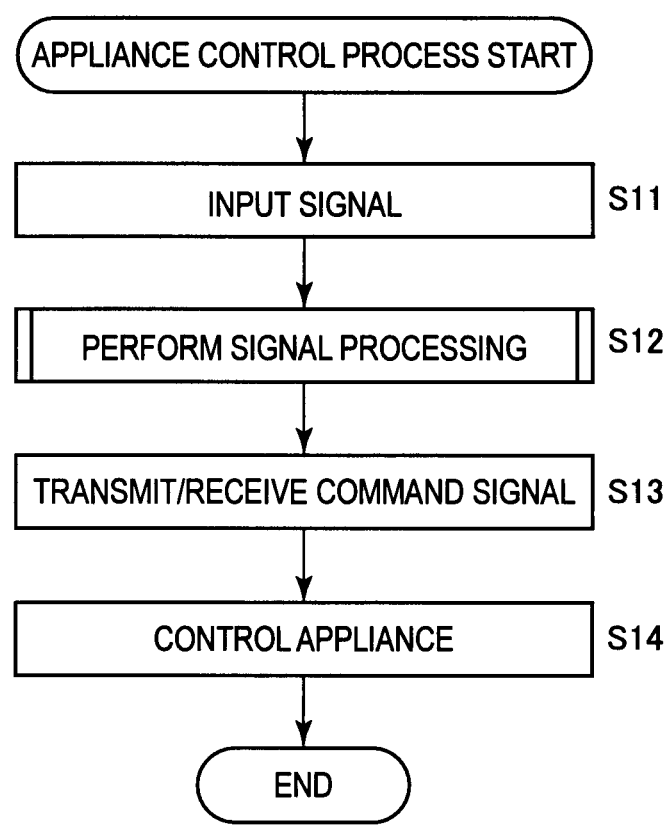
FIG. 7 is a flowchart describing a process in the voice commander device.
Figure 8:
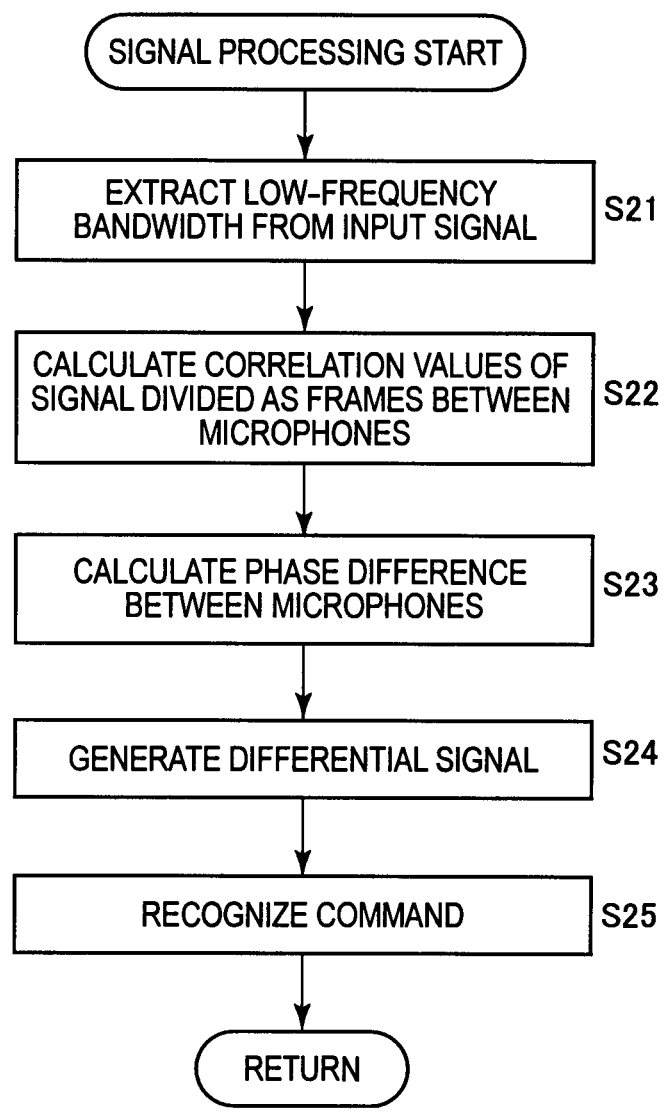
FIG. 8 is a flowchart describing signal processing.

Each of the signals input from the microphone 21-L and the microphone 21-R is input to the low-frequency bandwidth extracting part 42 through the input terminal 41 in step S11 shown in FIG. 7.

The low-frequency bandwidth extracting part 42 extracts a low-frequency bandwidth from the signal input from the input terminal 41, namely, a low-pass signal, for example, with the low-pass filter described above with reference to FIG. 5 in step S21. The low-frequency bandwidth extracting part 42 supplies the extracted low-pass signal to the part 43 for extracting feature quantities between the microphones.

As described above with reference to FIGS. 3 and 4, this can simultaneously eliminate the effect of inputting an external sound having the opposite phases between the microphones 21 equal to or higher than 567 Hz and the effect of inputting the signals of a speech having the identical phases between the microphones 21 equal to or higher than 50 Hz.

As a result, this can increase the accuracy of the process after the elimination. Specifically, the performance of command recognition by the command recognizing part 44 can be increased.

The correlation calculating part 51 divides the low-pass signal from the low-frequency bandwidth extracting part 42 as time frames, and calculates the cross-correlation values of the signal divided as frames between the two microphones 21 in step S22. The correlation calculating part 51 supplies the calculated cross-correlation values to the phase difference calculating part 52.

The phase difference calculating part 52 calculates the phase difference according to the cross-correlation values from the correlation calculating part 51 in step S23. In other words, the phase difference calculating part 52 obtains, as the phase different information, an index having a maximum absolute value of the cross-correlation value. The phase difference calculating part 52 supplies the obtained phase difference and its maximum value to the command recognizing part 44.

The command recognizing part 44 recognizes whether there is a command in the signal by solving the above-mentioned expressions (5) and (6) using the phase difference and its maximum value.

The differential signal generating part 53 generates the differential signal using the low-pass signal from the low-frequency bandwidth extracting part 42 in step S24. The differential signal generating part 53 supplies the obtained differential signal to the command recognizing part 44.

When there is a command in the signal, the command recognizing part 44 recognizes whether the input is from the microphone 21-L or from the microphone 21-R by solving the above-mentioned expressions (7) and (8) using the differential signal.

The command recognizing part 44 recognizes a command in step S25 using the phase difference and its maximum value from the phase difference calculating part 52 and the differential signal from the differential signal generating part 53 as the feature quantities, and then obtains the command recognizing result. The command recognizing part 44 supplies commander information denoting the obtained command recognition result to the command transmitting part 45. The command recognizing part 44 supplies the commander information that is the obtained command recognition result to the command transmitting part 45.

Specifically, as the first threshold determination, the command recognizing part 44 recognizes whether there is a command in the signal by solving the above-mentioned expressions (5) and (6) using the phase difference and its maximum value from the phase difference calculating part 52. The information for determining whether the command is positive or negative D1(fr) is calculated by this determination.

In other words, on the assumption that a solid-borne sound is characterized by the presence of opposite phases, a command can be recognized using the characteristic.

When there is a command in the signal, the command recognizing part 44 recognizes whether the input is from the microphone 21-L or from the microphone 21-R as the second threshold determination by solving the above-mentioned expressions (7) and (8) using the differential signal. The information for determining whether the microphone 21 is right or left D2(fr) is calculated by this determination.

Accordingly, it can be determined from which the input is, right or left. This can increase the number of operations of an object to be operated.

Then, the command recognizing part 44 calculates the commander information D(fr) by solving the above-mentioned expression (9) using the information for determining whether the command is positive or negative D1(fr) and the information for determining whether the microphone 21 is right or left D2(fr). The command recognizing part 44 supplies the obtained commander information D(fr) to the command transmitting part 45.

After step S25, the process goes back to step S12 in FIG. 7.

As described above, a command can be accurately recognized so that the user can operate a desired appliance by simply tapping the chassis in a direction opposite to the microphones 21 attached at the chassis on an axis (for example, the X-axis in FIG. 1).

Note that, although glasses is shown in FIG. 1 as an example of the chassis of the voice commander device 11 that can be worn by the user, the chassis of the voice commander device 11 is not limited to glasses. For example, a head-mounted display can be also used as the chassis of the voice commander device 11. Alternatively, other exemplary configurations of the appearance of the voice commander device 11 will be described below.

[Another Exemplary Configuration of Appearance of Voice Commander Device]

Figure 9:
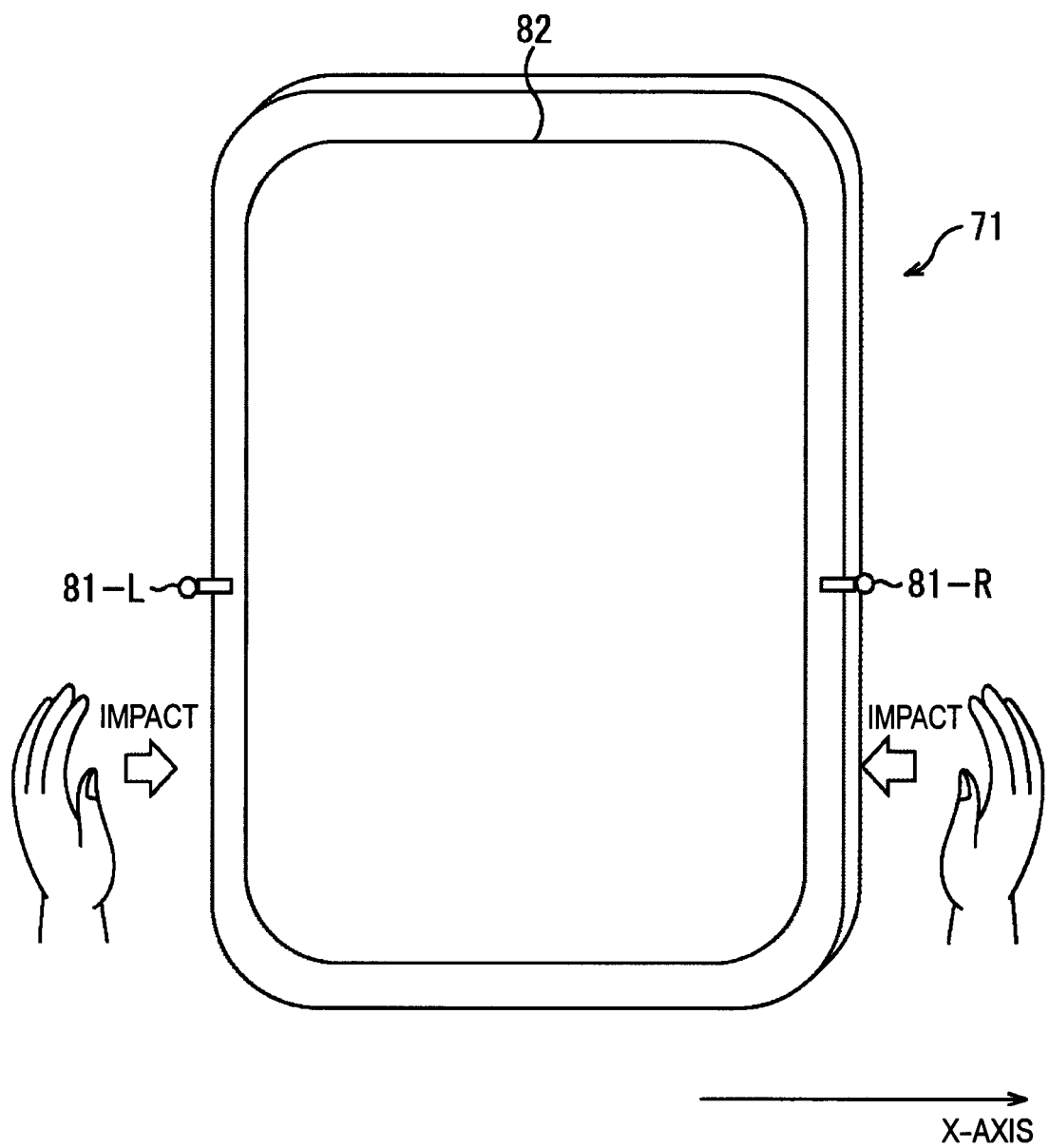
FIG. 9 is a view of another exemplary configuration of the appearance of the voice commander device.

FIG. 9 is a view of another exemplary configuration of the appearance of a voice commander device using the present technique.

A voice commander device 71 shown in FIG. 9, for example, is embedded in or attached to a tablet personal computer. In other words, the chassis of the voice commander device 71 is constituted of, for example, a tablet personal computer. Although the size of the chassis is larger than the user's hand as the example shown in FIG. 9, the size is not limited if the chassis can be carried. For example, it can be a palm-size chassis.

The voice commander device 71 includes microphones 81-L and 81-R, and an LCD 82. Note that the X-axis shows a widthwise direction and the right is its positive direction in the example shown in FIG. 9.

The microphone 81-L is placed at the left end of the chassis to face to the negative direction of the X-axis. Specifically, the microphone 81-L is placed at the center of the left frame of the LCD 82 provided at the front of the chassis. The microphone 81-R is placed at the right end of the chassis to face to the positive direction of the X-axis. Specifically, the microphone 81-R is placed at the center of the right frame of the LCD 82 provided at the front of the chassis.

In other words, the microphones 81-L and 81-R are oppositely placed to each other on the X-axis (to face to the outside in FIG. 9).

The user gives an impact to the chassis from the left side of the chassis of the voice commander device 71 (in the positive direction of the X-axis) or from the right side of the chassis (in the negative direction of the X-axis). This inputs a signal to the voice commander device 71 from the microphones 81-L and 81-R. In other words, an impact in the X-axis direction is input to the voice commander device 71 as a signal.

The voice commander device 71 performs signal processing on the input signal to recognize a command, and controls an appliance to be operated (not shown) using the command signal. In other words, the user can control the appliance to be operated by giving an impact to the chassis of the voice commander device 71.

Note that the voice commander device 71 shown in FIG. 9 basically has the same configuration as that of the voice commander device 11 shown in FIG. 1. In other words, the voice commander device 71 shown in FIG. 9 has the configuration described above with reference to FIG. 2, and operates described above with reference to FIGS. 7 and 8. Accordingly, the description of the configuration and operations of the voice commander device 71 is omitted because it has been done above.

[Another Exemplary Configuration of Appearance of Voice Commander Device]

Figure 10:
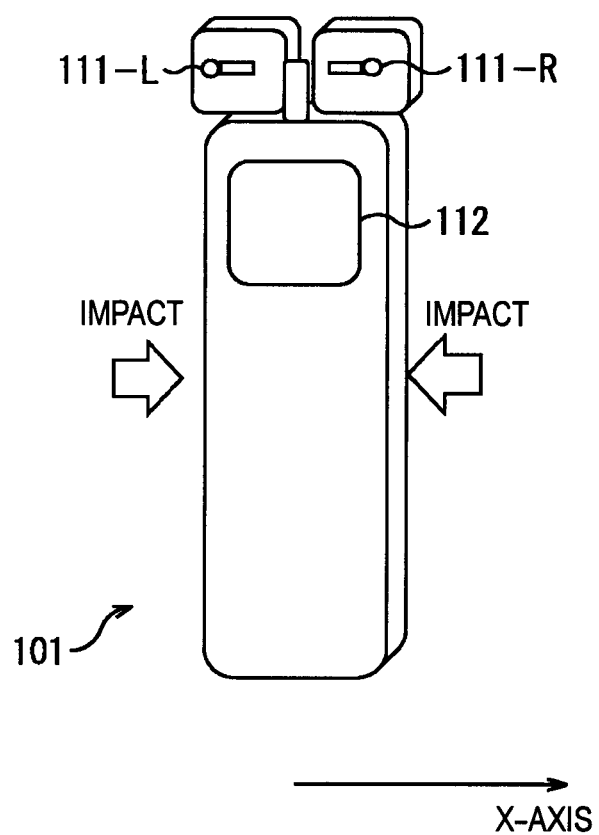
FIG. 10 is a view of another exemplary configuration of the appearance of the voice commander device.

FIG. 10 is a view of another exemplary configuration of the appearance of a voice commander device using the present technique.

A voice commander device 101 shown in FIG. 10, for example, is embedded in or attached to an IC recorder. In other words, the chassis of the voice commander device 101 is constituted of, for example, an IC recorder.

The voice commander device 101 includes microphones 111-L and 111-R, and an LCD 112. Note that the X-axis shows a widthwise direction and the right is its positive direction in the example shown in FIG. 10.

The LCD 112 for control is provided at the upper front of the chassis. The microphone 111-L is placed at the upper left end of the chassis to face to the negative direction of the X-axis. The microphone 111-R is placed at the upper right end of the chassis to face to the positive direction of the X-axis.

In other words, the microphones 111-L and 111-R are oppositely placed to each other on the X-axis (to face to the outside in FIG. 10).

The user gives an impact to the chassis from the left side of the chassis of the voice commander device 101 (in the positive direction of the X-axis) or from the right side of the chassis (in the negative direction of the X-axis). This inputs a signal to the voice commander device 101 from the microphones 111-L and 111-R. In other words, an impact in the X-axis direction is input to the voice commander device 101 as a signal.

The voice commander device 101 performs signal processing on the input signal to recognize a command, and controls an appliance to be operated (not shown) using the command signal. In other words, the user can control the appliance to be operated by giving an impact to the chassis of the voice commander device 101.

Note that the voice commander device 101 shown in FIG. 10 basically has the same configuration as that of the voice commander device 11 shown in FIG. 1. In other words, the voice commander device 101 shown in FIG. 10 has the configuration described above with reference to FIG. 2, and operates described above with reference to FIGS. 7 and 8. Accordingly, the description of the configuration and operations of the voice commander device 101 is omitted because it has been done above.

[Another Exemplary Configuration of Appearance of Voice Commander Device]

Figure 11:
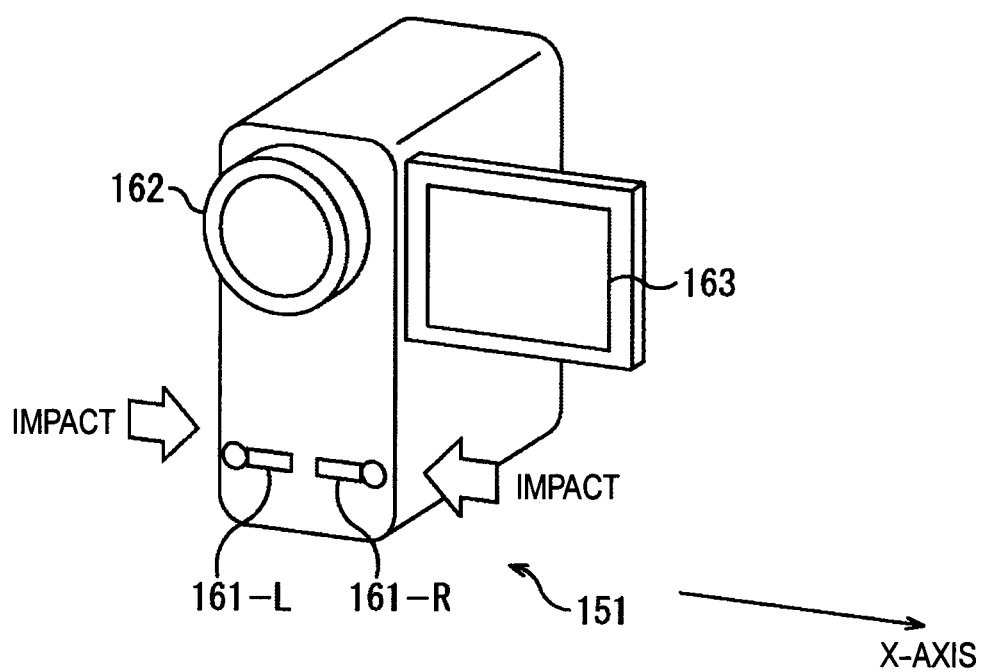
FIG. 11 is a view of another exemplary configuration of the appearance of the voice commander device.

FIG. 11 is a view of another exemplary configuration of the appearance of a voice commander device using the present technique.

A voice commander device 151 shown in FIG. 11, for example, is embedded in or attached to a portable camera. In other words, the chassis of the voice commander device 151 is constituted of, for example, a camera.

The voice commander device 151 includes microphones 161-L and 161-R, an imaging part 162 including a lens and the like, and an LCD 163. Note that the direction shown in FIG. 11 is the X-axis and the right is its positive direction.

The imaging part 162 is provided at the upper front of the chassis. The LCD 163 is provided at the right side of the chassis. The microphone 161-L is placed at the lower left side of the chassis to face to the negative direction of the X-axis. The microphone 161-R is placed at the lower right side of the chassis to face to the positive direction of the X-axis.

In other words, the microphones 161-L and 161-R are oppositely placed to each other on the X-axis (to face to the outside in FIG. 11).

The user gives an impact to the chassis from the left side of the chassis of the voice commander device 151 (in the positive direction of the X-axis) or from the right side of the chassis (in the negative direction of the X-axis). This inputs a signal to the voice commander device 151 from the microphones 161-L and 161-R. In other words, an impact in the X-axis direction is input to the voice commander device 151 as a signal.

The voice commander device 151 performs signal processing on the input signal to recognize a command, and controls an appliance to be operated (not shown) using the command signal. In other words, the user can control the appliance to be operated by giving an impact to the chassis of the voice commander device 151.

Note that the voice commander device 151 shown in FIG. 11 basically has the same configuration as that of the voice commander device 11 shown in FIG. 1. In other words, the voice commander device 151 shown in FIG. 11 has the configuration described above with reference to FIG. 2, and operates described above with reference to FIGS. 7 and 8. Accordingly, the description of the configuration and operations of the voice commander device 151 is omitted because it has been done above.

Although the chassis of the voice commander device is preferably a material that can be attached by the user, that can be worn by the user, or that can be carried as described above, a material other than the above can be used as the chassis, if the size of the material is not too large.

In other words, any device can be used if the distance A between at least two provided microphones can prevent the difference B described above with reference to FIG. 3 from including the half-wavelength of the low frequency band passed through the used low-pass filter.

The above-described sequence of processes can be implemented by hardware and also by software. When software implements the processes, a program constituting the software is installed, through a program recording medium, on, for example, a computer embedded in dedicated hardware or a computer capable of implementing each function by installing each type of programs such as a general personal computer.

[Exemplary Configuration of Computer]

Figure 12:
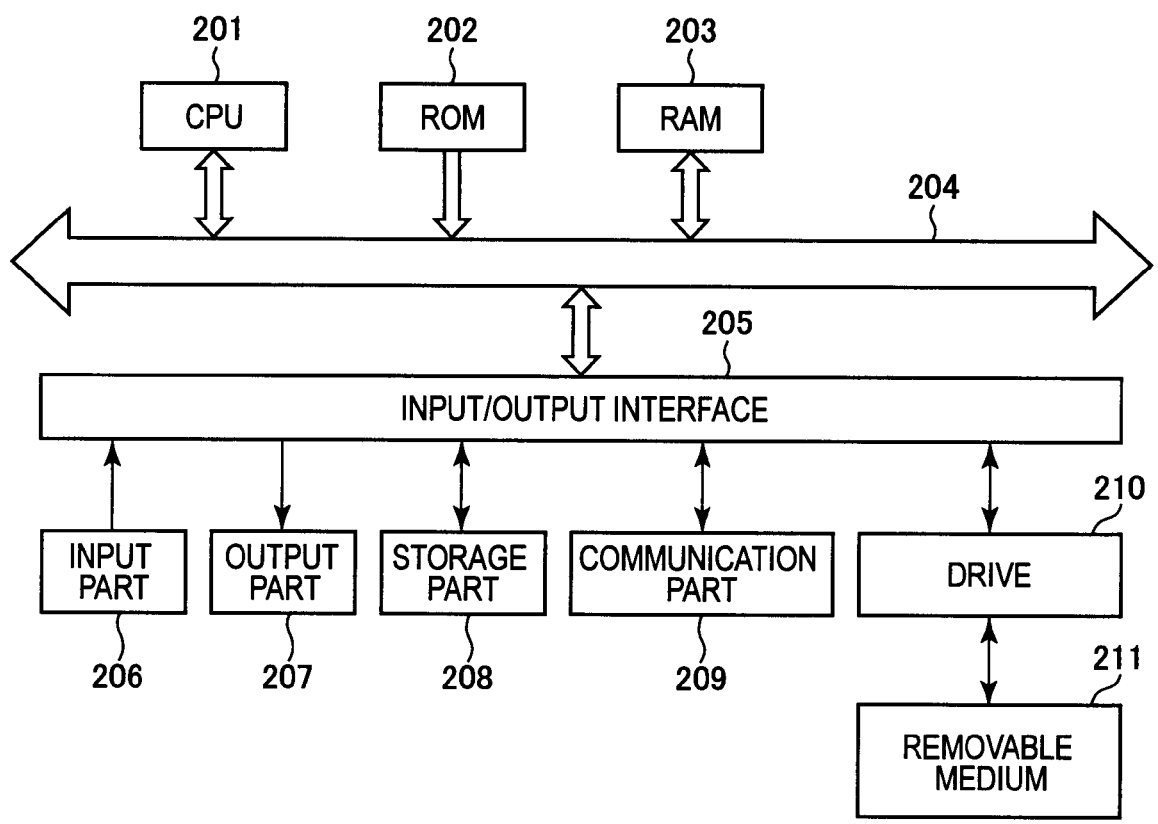
FIG. 12 is a block diagram of an exemplary configuration of a computer.

FIG. 12 is a block diagram of an exemplary configuration of hardware of a computer implemented by the above-described sequence of processes by a program.

A central processing unit (CPU) 201 performs each type of process according to a program stored in a read only memory (ROM) 202 and a storage part 208. A random access memory (RAM) 203 properly stores a program executed by the CPU 201, data, or the like. The CPU 201, the ROM 202, and the RAM 203 are interconnected to each other through a bus 204.

The CPU 201 is also connected to an input/output interface 205 through the bus 204. The input/output interface 205 is connected to an input part 206 and an output part 207. The input part 206 includes a keyboard, a mouse, a microphone, and the like. The output part 207 includes a display, a loud speaker, and the like. The CPU 201 performs various types of process according to the instructions input from the input part 206. Then, the CPU 201 outputs the result of the process to the output part 207.

The storage part 208 connected to the input/output interface 205 includes, for example, a hard disc, and stores a program executed by the CPU 201 and various data. A communication part 209 communicates with an external device through a network such as the Internet or a local area network.

Alternatively, a program can be obtained through the communication part 209 and can be stored in the storage part 208.

When the removable medium 211 is mounted on the computer, a drive 210 connected to the input/output interface 205 drives a removable medium 211 such as a magnetic disk, an optical disk, a magneto optical disk or a semiconductor memory to obtain a program, data or the like recorded on the removable medium 211. The obtained program or data is transferred to and stored in the storage part 208 as necessary.

The program installed on a computer and to be executed by the computer is recorded on (stored in) a recording medium including the removable medium 211 as shown in FIG. 12, a hard disc or the like. The removable medium 211 is a package medium including, for example, a magnetic disk (including a flexible disk), an optical disk (including a compact disc-read only memory (CD-ROM), or a digital versatile disc (DVD)), a magneto optical disk (including a mini-disc (MD)), or a semiconductor memory. The hard disc includes the ROM 202 temporarily or permanently storing a program and the storage part 208. The recording medium records a program, as necessary, through the communication part 209 using a wired or wireless transmission medium such as a local area network, the Internet, and a digital satellite broadcast. The communication part 209 is an interface of a router, a modem, or the like.

Note that the description of the above-described sequence of processes herein includes not only processes sequentially performed in the described time order but also processes performed in parallel or separately, not necessarily sequentially.

Embodiments of the present disclosure are not limited to the above-described embodiments and can be variously modified within the gist of the present disclosure.

It should be understood by those skilled in the art that various modifications, combinations, sub-combinations and alterations may occur depending on design requirements and other factors insofar as they are within the scope of the appended claims or the equivalents thereof.

The present technology may also be configured as below.

(1) An input device comprising:
at least two microphones placed at different positions on a chassis to face different directions on one of space axes;
a low-frequency bandwidth extracting part for extracting a low-frequency bandwidth signal from a signal input from the microphones;
a phase difference calculating part for calculating a phase difference using the low-frequency bandwidth signal extracted by the low-frequency bandwidth extracting part; and
a control signal generating part for generating a control signal based on the phase difference calculated by the phase difference calculating part.

(2) The input device according to (1),
wherein, when there are opposite phases in a low frequency band, the control signal generating part generates a control signal based on the phase difference calculated by the phase difference calculating part.

(3) The input device according to (1) or (2),
wherein a low-pass filter used by the low-frequency bandwidth extracting part is determined in view of a distance between the microphones.

(4) The input device according to (1) or (2),
wherein a low-pass filter used by the low-frequency bandwidth extracting part is determined in view of a frequency of a speech.

(5) The input device according to any one of (1) to (4), further comprising:
a differential signal generating part for generating a differential signal using the low-frequency bandwidth signal extracted by the low-frequency bandwidth extracting part,
wherein the control signal generating part generates the control signal based on the differential signal generated by the differential signal generating part.

(6) The input device according to (5),
wherein the control signal generating part determines, based on the differential signal generated by the differential signal generating part, from which microphone an input has been performed, and generates the control signal.

(7) The input device according to any one of (1) to (6),
wherein the microphones are placed to face the different directions on the axis where an impact is given to the chassis.

(8) The input device according to any one of (1) to (7),
wherein the chassis is attached to a body.

(9) A signal processing method, comprising, with an input device including at least two microphones placed at different positions on a chassis to face different directions on one of space axes:
extracting a low-frequency bandwidth signal from a signal input from the microphones,
calculating a phase difference using the extracted low-frequency bandwidth signal, and
generating a control signal based on the calculated phase difference.

(10) A program causing an input device including at least two microphones placed at different positions on a chassis to face different directions on one of space axes to function as:
a low-frequency bandwidth extracting part for extracting a low-frequency bandwidth signal from a signal input from the microphones, a phase difference calculating part for calculating a phase difference using the low-frequency bandwidth signal extracted by the low-frequency bandwidth extracting part, and a control signal generating part for generating a control signal based on the phase difference calculated by the phase difference calculating part.

(11) A recording medium having recorded thereon the program according to (10).

The present disclosure contains subject matter related to that disclosed in Japanese Priority Patent Application JP 2011-163153 filed in the Japan Patent Office on Jul. 26, 2011, the entire content of which is hereby incorporated by reference.

What is claimed is:

1. An input device comprising:
   at least two microphones placed at different positions on a chassis to face different directions on one of space axes;
   a low-frequency bandwidth extracting part for extracting a low-frequency bandwidth signal from each signal input from the at least two microphones created as a result from a physical contact to the chassis that causes a vibration or movement of the chassis;
   a phase difference calculating part for calculating a phase difference between the signal inputs from each one of the at least two microphones using the low-frequency bandwidth signals extracted by the low-frequency bandwidth extracting part; and
   a control signal generating part for generating a control signal based on the phase difference calculated by the phase difference calculating part.

2. The input device according to claim 1,
   wherein, when there are opposite phases in a low frequency band, the control signal generating part generates a control signal based on the phase difference calculated by the phase difference calculating part.

3. The input device according to claim 1,
   wherein a low-pass filter used by the low-frequency bandwidth extracting part is determined in view of a distance between the microphones.

4. The input device according to claim 1,
   wherein a low-pass filter used by the low-frequency bandwidth extracting part is determined in view of a frequency of a speech.

5. The input device according to claim 1, further comprising:
   a differential signal generating part for generating a differential signal using the low-frequency bandwidth signals extracted by the low-frequency bandwidth extracting part,
   wherein the control signal generating part generates the control signal based on the differential signal generated by the differential signal generating part.

6. The input device according to claim 5,
   wherein the control signal generating part determines, based on the differential signal generated by the differential signal generating part, from which microphone an input has been performed, and generates the control signal.

7. The input device according to claim 1,
   wherein the microphones are placed to face the different directions on the axis where an impact is given to the chassis.

8. The input device according to claim 1,
   wherein the chassis is attached to a body.

9. A signal processing method, comprising, with an input device including at least two microphones placed at different positions on a chassis to face different directions on one of space axes:
   extracting a low-frequency bandwidth signal from signals input from the at least two microphones created as a result from a physical contact to the chassis that causes a vibration or movement of the chassis,
   calculating a phase difference between the signal inputs from each one of the at least two microphones using the extracted low-frequency bandwidth signals, and
   generating a control signal based on the calculated phase difference.

10. A non-transitory computer-readable medium having embodied thereon a program, which when executed by a processor of an input device including at least two microphones placed at different positions on a chassis to face different directions on one of space axes, causes the processor to execute a method, the method comprising:
    extracting a low-frequency bandwidth signal from signals input from the at least two microphones created as a result from a physical contact to the chassis that causes a vibration or movement of the chassis,
    calculating a phase difference between the signals input from each one of the at least two microphones using the extracted low-frequency bandwidth signals, and
    generating a control signal based on the calculated phase difference.

* * * * *